Figure 1:
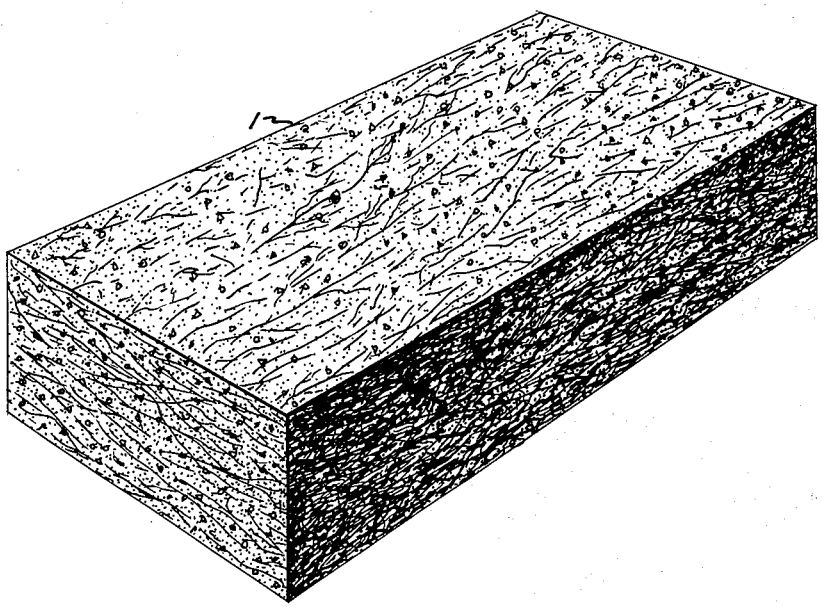

Dec. 31, 1963 C. J. WAGNER 3,115,864
WORM HABITAT AND COMPOSITE FORM THEREOF
Filed July 12, 1960

INVENTOR.
CARMAN J. WAGNER
BY
ATTORNEY

United States Patent Office 3,115,864
Patented Dec. 31, 1963

3,115,864
WORM HABITAT AND COMPOSITE
FORM THEREOF
Carman J. Wagner, Rte. 1, Box 191, Porterfield, Wis.
Filed July 12, 1960, Ser. No. 42,252
6 Claims. (Cl. 119—1)

This invention relates to a habitat composition for earthworms and in particular to worm habitat compositions which are especially suitable for shaping into composite block forms which thereby render the materials especially suitable for packaging, shipping, displaying and otherwise handling.

A general object of the invention is to provide a habitat composition for earthworms.

Another object is to provide a composition of matter suitable for use as a worm bedding and wherein the composition includes food and other materials necessary to sustain worm life and their reproduction.

Another object is to provide a worm bedding which is compressible into block forms that permit the easy packaging, handling and shipping of the bedding materials.

Another object is to provide composite blocks which are composed of materials suitable for the sustenance of worm life and their reproduction and which retain their shape upon being formed into blocks.

Another object of the invention is to provide a composite block of materials capable of sustaining worm life and reproduction upon being moistened and wherein the materials are so chosen in size and quantities as to be subjected to block formation and capable of retaining the shape during normal handling and shipping incident to the sale of such bedding materials.

The worm bedding of the invention described herein is an admixture of materials and is composed predominantly of cellulosic material, preferably comminuted newspaper materials. It is further composed of worm food materials capable in combination of sustaining worm life and their reproduction and also preferably includes an alkaline sweetening agent suitable for retarding the formation of acidic conditions which if not retarded contribute to suppressing worm reproduction and life in the admixture.

Another feature of the invention is the provision of compositions which not only function as a habitat for worms but which also are composed of materials which lend themselves in the combination to the formation of composite block formations by compression methods. The block formations referred to readily retain their shape without the use of binding materials which otherwise would serve only as inert constituents in the bedding materials. In this respect it has been found that by suitably proportioning the cellulosic and grit materials of the admixtures and using the hereinafter identified particulate sizes thereof together with certain select worm food materials which serve a dual function in that they act not only as a worm food in the ultimate uses but also as a binding material for the block composite, that the block formations will readily withstand the normal wear and tear associated with packaging and shipping of the materials. The composite blocks furthermore are cheaper to handle and less expensive to ship because of their greater density.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a rectangular composite block prepared from materials hereinafter described in accord wiwth the invention.

As previously stated, the major component of the worm habitat composition is cellulosic material. Comminuted newspapers are preferred because of their cheapness and the observation that the inks found therein supplement the worm diet. The comminuted newspapers serve as an absorbent for water and certain dietary constituents hereinafter identified and further function as an insulation against heat which is known to rapidly kill off worm life when, for example, the composition is employed as a worm habitat under conditions wherein the surrounding environment is subject to wide temperature variation. Thus the cellulosic materials serve as an insulation against heat when worms are shipped over great distances as, for example, in railroad boxcars which are not refrigerated and which pass through areas of extreme temperature conditions.

For the formation of block composites the cellulosic materials are ground, as, for example, in a hammer mill to a particulate size ranging from about $\frac{1}{16}$ inch to about $\frac{3}{32}$ inch. Grit materials, such as sand or gravel, and which have a particulate size of less than about $\frac{1}{8}$ inch, is admixed with the comminuted cellulosic material in the compositions employed for the composite block formations in amounts ranging from about 20 parts to about 40 parts of grit materials per 100 parts of cellulosic materials. (All parts referred to herein are set forth on a weight basis.) These combinations of the grit materials and cellulosic materials have been found especially suitable for the formation of the composite blocks described hereinafter in that the blocks have greater strength and thereby are more suitable than compositions which do not contain grit materials or which contain combinations of cellulosic and grit materials having particulate sizes outside of the ranges specified.

In addition to the comminuted newspaper and grit materials the admixture forming the worm habitat composition includes worm foods and may also and preferably does include a small amount of alkaline sweetening agent such as sodium bicarbonate (baking soda). The sodium bicarbonate is employed in the admixture in amounts ranging from about $\frac{1}{4}$ part to about $\frac{3}{4}$ part per 100 parts of cellulosic materials and functions as a slime retarding agent by neutralizing slime causing acids which form in or are introduced into the habitat composition.

Worm foods including fats and oils are employed in the admixture for dietary purposes. The fats and oils serve additionally as binding agents in the formation of the composite block formation and are employed in amounts ranging from about 2 parts to about 6 parts of fat and oil per 100 parts of cellulosic material. Typical admixtures which produce excellent composite blocks contain from about $\frac{1}{2}$ part to 2 parts of an animal fat, such as pork lard, per 100 parts of cellulosic material, and from about 2 parts to 4 parts of a vegetable oil, such as cottonseed or soybean oil, per 100 parts of cellulosic material in addition to the grit and cellulosic materials heretofore referred to. The oils are preferably refined to avoid rancidity. Cod liver oil may also be admixed with the materials as a dietary supplement.

Other worm foods such as dairy compost, alfalfa meal, and bone meal are also preferably employed in the mixture. Typical admixtures which may be formed into composite blocks and which contain these worm foods are identified as follows:

| | Parts |
|---|---|
| Comminuted newspaper (1/16" to 3/32" in particulate size) | 100 |
| Gravel (less than 1/8" in particulate size) | 20–40 |
| Sodium bicarbonate | 1/4–3/4 |
| Bone meal | 1 1/2–7 |
| Alfalfa meal | 1/2–3 |
| Dairy compost | 3–20 |
| Pork lard | 1/2–2 |
| Cottonseed and/or soyben oil (refined) | 2–4 |
| Cod liver oil | 0.1 |

The composite blocks of the worm habitat composition may be formed by suitably mixing the indicated components in the amounts indicated and thereafter compressing the loose, bulky mass of admixed ingredients to about 1/10 its volume, thereby increasing the bulk density about 10 times the bulk density of the uncompressed mixture.

A suitable dairy compost which has been found to be especially effective is that covered by Patent No. 2,750,269 and which is a currently available commercial form, assaying as follows:

| | |
|---|---|
| Organic matter | 67% by weight. |
| Inert constituents | 33% by weight. |
| Phosphorous | 339 mgs./100 gms. |
| Potassium | 900 mgs./100 gms. |
| Magnesium | 1,340 mgs./100 gms. |
| Calcium | 2,730 mgs./100 gms. |
| Nitrogen | 1.07%. |
| Manganese | 426 p.p.m. |
| Iron | 903 mgs./100 gms. |

The following example serves to further illustrate the preparation of a worm bedding material or worm habitat which is suitable for use in forming composite blocks suitable for packaging, shipping and handling.

*Example*

100 lbs. of comminuted newspaper material prepared by breaking up into particulate form in a hammer mill and which had a particle size (determined by screening) ranging from 1/16" to 3/32" was mixed with 30 lbs. of gravel which had been screened to pass through a 1/8" screen. Thereafter the following materials in the indicated amounts were added to the mixture and thoroughly mixed therewith:

| | Lbs. |
|---|---|
| Sodium bicarbonate (baking soda) | 1/2 |
| Bone meal | 2 1/2 |
| Alfalfa meal | 1 |
| Dairy compost having aforementioned assay | 5 |
| Pork lard | 1 |
| Cottonseed oil (refined) | 3 3/4 |
| Cod liver oil | 1/2 |

To form composite blocks, portions of the admixture were respectively placed in a 4" x 7" mold to a depth of 20 inches and thereafter compressed by a mold fitting plunger to a block having a size of 4" x 7" x 2", thus reducing the bulk volume of the admixture to 1/10 its bulk volume in the uncompressed state. The blocks obtained were found to exhibit good strengths and to withstand normal handling and shipping conditions without excessive crumbling and chipping. Furthermore, upon being moistened with small amounts of water, the blocks were found to be easily crumbled by hand into particulate form and to be excellent bedding material or habitat composition for earthworms. Tests conducted indicate that not only do earthworms survive and thrive in the material but that considerable reproducing is evident.

FIG. 1 illustrates a rectangular composite block formed of the material prepared by compression in a mold. It will be apparent that the block forms may be rectangular as shown at 1 in the figure, or any other suitable shapes, such as cylindrical, square etc.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A habitat composition for earthworms adopted for compression into block form comprising an admixture composed predominantly of particulate cellulosic material derived from newspaper, said admixture being further composed of worm food including vegetable oil and animal fat, and a small amount of an alkaline sweetening agent.

2. A habitat composition for earthworms adopted for compression into block form comprising an admixture composed predominantly of comminuted newspaper material, said admixture being further composed of from about 20 parts to about 40 parts grit material per 100 parts of said newspaper material, a small amount of an alkaline sweetening agent and the balance being worm food.

3. A habitat composition for earthworms adopted for compression into block form comprising an admixture composed predominantly of comminuted newspaper material having a particle size of from about 1/16 inch to about 3/32 inch, said admixture further including from about 20 parts to about 40 parts grit material per 100 parts of said newspaper material wherein said grit material has a particle size less than about 1/8 inch, and worm food including from about 2 parts to about 6 parts of animal fat and vegetable oil per 100 parts of said newspaper material.

4. A habitat composition for earthworms adopted for compression into block form comprising an admixture consisting of comminuted newspaper material, having a particle size of from about 1/16 inch to about 3/32 inch, about 30 parts of grit material having a particle size less than about 1/8 inch per 100 parts of said newspaper material, about 1/2 part of baking soda per 100 parts of said newspaper material and the following worm food materials in the approximate indicated proportions:

Bone meal—2 1/2 parts per 100 parts of newspaper material

Alfalfa meal—1 part per 100 parts of newspaper material

Dairy compost—5 parts per 100 parts of newspaper material

Pork lard—1 part per 100 parts of newspaper material

Cod liver oil—1/10 part per 100 parts of newspaper material

Vegetable oil—3 3/4 parts per 100 parts of newspaper material wherein said refined oil is selected from the group consisting of refined cottonseed oil and refined soybean oil.

5. A compressed block suitable for use as a worm habitat upon being moistened and broken up comprising an admixture of particulate cellulosic material, grit material and worm food including animal fat and vegetable oil which bind said cellulosic and grit materials together, said cellulosic material having a particle size of from about 1/16 inch to about 3/32 inch, said grit material having a particle size of less than about 1/8 inch and being present in said admixture in amounts ranging from about 20 parts to about 40 parts of said grit material per 100 parts of said cellulosic material, and said fat and oil being present in said admixture in amounts ranging from about 2 parts to about 6 parts of fat and oil per 100 parts of said cellulosic mixture.

6. A block according to claim 5 wherein said admixture further includes an alkaline sweetening agent.

References Cited in the file of this patent

UNITED STATES PATENTS

| | | |
|---|---|---|
| 2,527,214 | Graves | Oct. 24, 1950 |
| 2,708,418 | Sugarman et al. | May 17, 1955 |
| 2,715,067 | Kamlet | Aug. 9, 1955 |
| 2,813,793 | Drennan | Nov. 19, 1957 |
| 2,841,113 | Ebert | July 1, 1958 |
| 2,867,055 | Lebiedzinski | Jan. 6, 1959 |